US007093353B2

(12) United States Patent
Cassese et al.

(10) Patent No.: US 7,093,353 B2
(45) Date of Patent: Aug. 22, 2006

(54) AUTOMATIC UNIT FOR INSERTING HANGERS FROM A STRIP OF ATTACHED STAPLES

(75) Inventors: Pierre Cassese, St Ouen en Brie (FR); Alain Cassese, Breau (FR); Jean Cassese, Lieusaint (FR); Philippe Cassese, St Germain Laxis (FR)

(73) Assignee: Cassese Societe Anonyme, Verneuil l'Etang (FR)

(*) Notice: Subject to any disclaimer, the term of this patent is extended or adjusted under 35 U.S.C. 154(b) by 223 days.

(21) Appl. No.: 10/451,905

(22) PCT Filed: Dec. 21, 2001

(86) PCT No.: PCT/FR01/04157

§ 371 (c)(1),
(2), (4) Date: Nov. 25, 2003

(87) PCT Pub. No.: WO02/053333

PCT Pub. Date: Jul. 11, 2002

(65) Prior Publication Data

US 2004/0094596 A1 May 20, 2004

(30) Foreign Application Priority Data

Dec. 28, 2000 (FR) .................................. 00 17183

(51) Int. Cl.
*B23P 19/00* (2006.01)

(52) U.S. Cl. ........................... 29/798; 29/414; 29/417; 29/432; 83/658; 83/697; 83/856; 227/76; 227/119; 227/154

(58) Field of Classification Search ................. 29/432, 29/432.1, 798, 413, 414, 417, 564.6; 227/21, 227/27, 68, 76, 93, 119, 154, 18; 83/658, 83/697, 699.11, 856
See application file for complete search history.

(56) References Cited

U.S. PATENT DOCUMENTS

| | | | | |
|---|---|---|---|---|
| 3,263,542 | A * | 8/1966 | Langwell | 83/241 |
| 3,924,504 | A * | 12/1975 | Kurtz | 83/568 |
| 5,890,276 | A * | 4/1999 | Lorincz | 29/564.6 |

FOREIGN PATENT DOCUMENTS

| | | | |
|---|---|---|---|
| EP | 565060 | A1 * | 10/1993 |
| EP | 899054 | A1 * | 3/1999 |

* cited by examiner

*Primary Examiner*—Jermie E. Cozart
(74) *Attorney, Agent, or Firm*—Finnegan, Henderson, Farabow, Garrett & Dunner, L.L.P.

(57) ABSTRACT

A hanger taken from a strip of hangers is positioned on a fastening and cutting anvil (6) displaceable between a bottom position, in which it retracts below the level of the support plate (1) and a top position, in which it projects above the plate. A blade (17), the central part of which forms a bridge beneath which the strip of hangers passes, is fixed to the plate, in contact with the anvil.

8 Claims, 3 Drawing Sheets

AUTOMATIC UNIT FOR INSERTING HANGERS FROM A STRIP OF ATTACHED STAPLES

BACKGROUND OF THE INVENTION

The invention relates to an automatic machine for fastening frame hangers taken from a strip bearing hangers joined together.

For individually mounting hangers for frame backs, there are known pneumatic fastening machines, the fastening head of which, displaced by a piston, or a jack, enables a pressure to be applied to the hanger positioned blindly on said head, to apply it to the back of the frame, which, itself, bears on a support plate.

There is also known another form of pneumatic fastening machine such as the one described in French patent No. 99 16717 in the name of the Applicant, in which machine the hanger is positioned, not on the fastening head but on a specially shaped anvil located on a support plate. The fastening head is then mounted so as to be able to be disengaged from the area of positioning of the hanger on the support plate, through the action of an operating mechanism, the object being to gain easy access to the specially shaped anvil. Of course, a protective cover drops down around the anvil, at the time of the stapling operation, in order to avoid any risk of accident.

This machine thus operates on a step by step basis and requires the operator to perform an operation to position each hanger and to remove each board stapled.

To increase the speed at which these hangers are mounted, the Applicant has developed an automatic fastening machine operating from a strip of hangers joined to one another side by side, with the strip traveling step by step towards the work station, at which the hangers are detached, each neighbouring hanger in turn, and then fastened by the fastening head.

SUMMARY OF THE INVENTION

One main object of the present invention is thus to provide an automatic machine for fastening frame hangers taken from a strip of hangers joined together, said machine comprising a vertically mobile fastening head, controlled by a jack, for driving into a board a hanger positioned in relation to a specially shaped anvil located on a support plate, a fastening machine wherein said specially shaped anvil is a fastening and cutting anvil displaceable between a bottom position, in which it retracts below the level of the support plate and a top position, in which it projects above said plate, a blade the central part of which forms a bridge being fixed to the plate, in contact with the anvil.

BRIEF DESCRIPTION OF THE DRAWINGS

Further particular features of the invention will emerge from the description that follows of an exemplary embodiment in which reference is made to the annexed drawings, which represent.

DETAILED DESCRIPTION OF THE INVENTION

Figure 1:
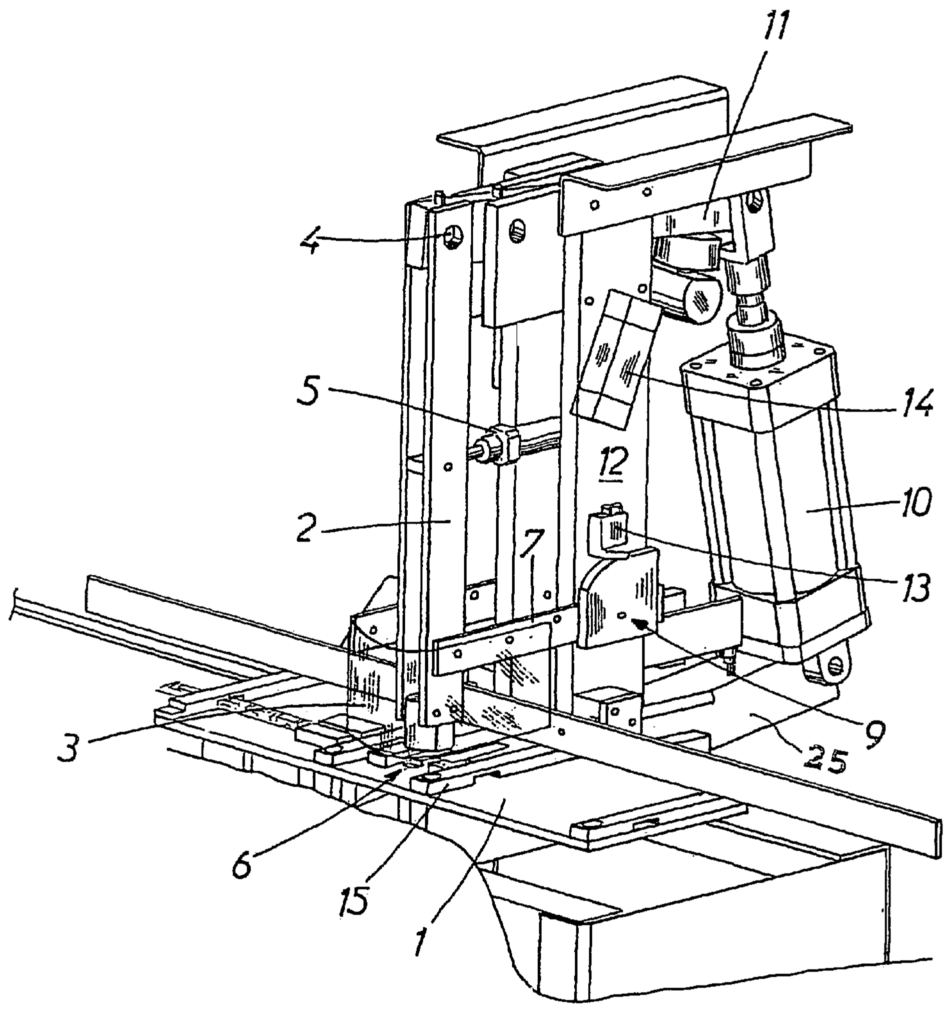
FIG. 1, an overall perspective view of the automatic fastening machine.

The fastening machine shown in FIG. 1 essentially comprises a support plate 1 for positioning the board and the hanger on a fastening and cutting anvil 6 with which the plate is provided, a fastening head 2 for driving in the hanger, and head operating mechanisms.

Head 2, which extends vertically in the fastening machine, above the table, is hinged, in the upper portion, about a horizontal axis 4. It can thus pivot, through the action of a small jack 5, between two positions: a first, vertical position, in which the end of the head is vertically above the hanger, and a second, inclined position, in which the head is tilted rearwards of the machine and thus leaves clear the area of positioning of the hanger.

The plate is also provided with guide bars 15 facilitating the correct positioning of the board, and between which anvil 6 is located. A protective cover 3 is mounted on arms 7 pivoting about a horizontal axis 9.

Fastening head 2 is thus displaceable, through the action of jack 5, between an inclined position and the position shown in FIG. 1. Its downward movement is ensured by means of a main jack 10 via a connecting rod 11 pivotally bearing upon a central bracket or jib 12. The lower part of jack 10 hinges on a swinging lever 25 which extends beneath the plate, the opposite end of which supports anvil 6. Horizontal axis 4 is located at the end of connecting rod 11. A contact breaker 13 is mounted on the end of one of arms 7 and connected to the control box of a pneumatic distributor 14 advantageously mounted on the central jib. pivotally bearing upon a central bracket or jib 12. The lower part of jack 10 hinges on a swinging lever 25 which extends beneath the plate, a lever the opposite end of which supports anvil 6. Horizontal axis 4 is located at the end of connecting rod 11. A contact breaker 13 is mounted on the end of one of arms 7 and connected to the control box of a pneumatic distributor 14 advantageously mounted on the central jib.

Figure 2:
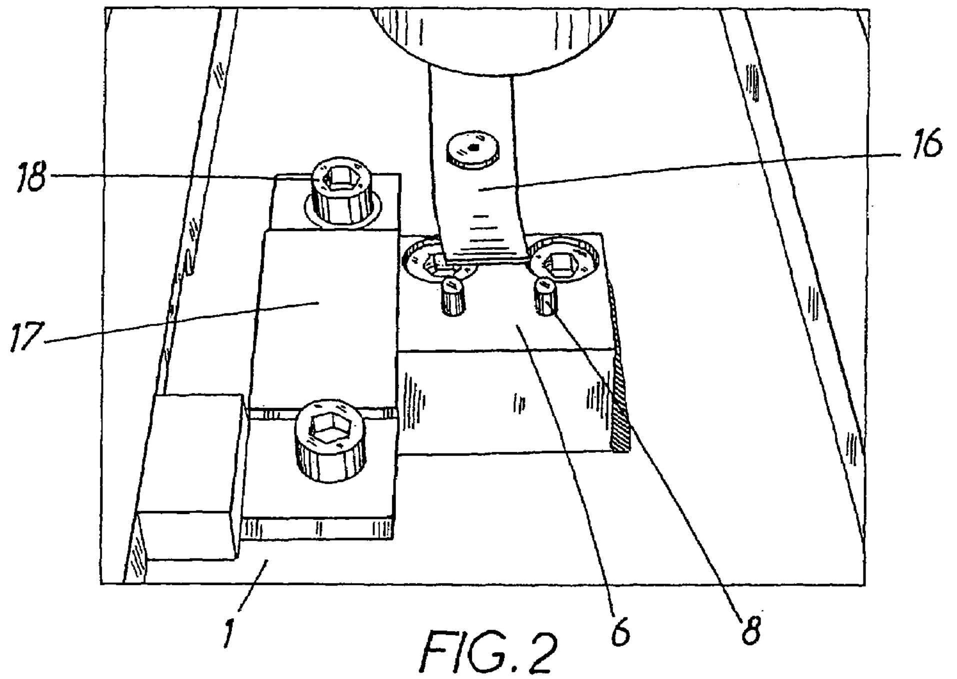
FIG. 2, a larger scale perspective view of the support plate, with the anvil in top position.

FIG. 2 gives a more detailed view of the design of fastening and cutting anvil 6, shown here in top position and which is displaceable between a bottom position in which it retracts below the level of the support plate, and this top position, in which it projects above said plate. It has the shape of a parallelepiped, and its upper face is equipped with two pins 8. The end of a flexible strip 16 fixed to support plate 1 comes to bear on the border of the anvil. Beside the latter is disposed a blade 17, fixed to the plate by screws 18, the central part of said blade forming a bridge overlying the plate, which blade is in contact with the anvil.

Figure 3:
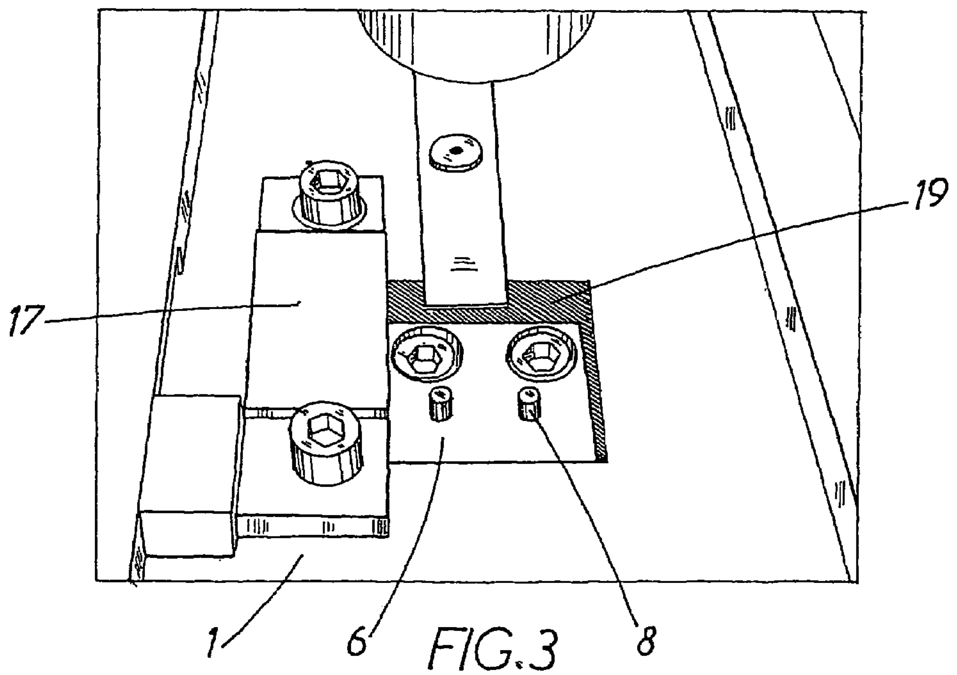
FIG. 3, a view analogous to that of FIG. 2, with the anvil in bottom position.

FIG. 3 shows anvil 3 retracted below the level of the plate into an opening 19. The anvil is thus mounted on lever 25 in order to be able to take up one or the other of the two positions.

Figure 4:
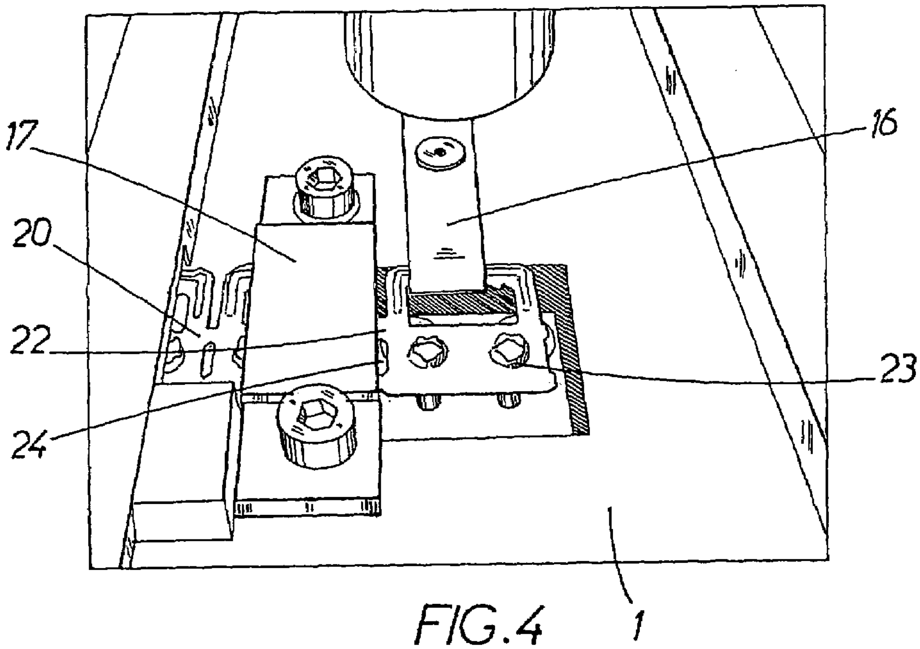
FIG. 4 a view analogous to that of FIG. 3, showing the introduction of a strip of hangers onto the plate.
Figure 5:
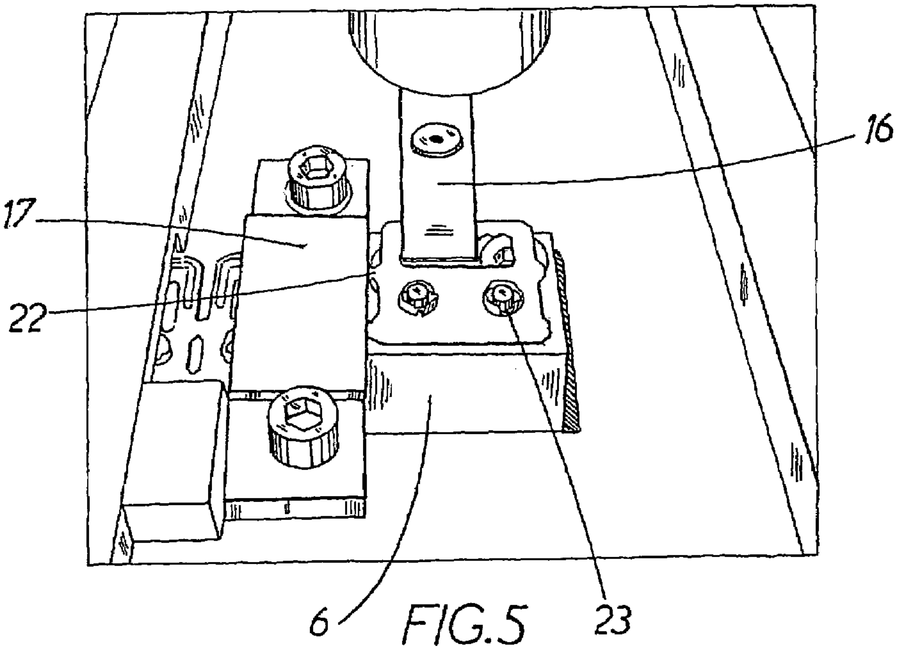
FIG. 5 a view analogous to that of FIG. 4, showing the anvil in top position, bearing a hanger.

When it is in bottom position, the end of the strip of hangers 20 can be placed thereover, said strip being passed underneath the bridge of blade 17, as more clearly apparent from FIG. 4. The strip is formed of a succession of hangers interconnected by small connecting tabs 22 separated by a pre-cut portion 24. The latter is essential owing to the notch that has to be provided in blade 17 to allow through rose or disc elements 23, it being impossible to cut the strip in this area. Pre-cut portion 24 is therefore located in alignment with said rose or disc elements 23.

Each hanger bears, in a manner known per se, anchoring rose elements 23 separated from one another by the same spacing as for pins 8.

The strip of hangers is thus positioned manually in the case of the first hanger, as shown in FIG. 4. With the protective cover lowered, the machine can function as follows. Initially, anvil 6 is caused to be raised, this being caused by the deployment of the rod of the jack, which releases the weight of the latter, a weight which is exerted on lever 25 in the direction of raising of anvil 6 until it comes into contact with strip 20. This has the effect of causing pins 8 to penetrate rose elements 23 of the first hanger to maintain the latter in a correct position on the anvil, and to halt the swinging of lever 25. Deployment of the jack rod continues, which causes fastening head 2 to be lowered via lever 11. At the same time, through this pinching effect, the connecting tabs 22 between the first and second hangers in the strip are sheared by the edge of blade 17, against which the border of the anvil rises. The cutting of the hangers is facilitated by the pre-cut portion 24 provided between the connecting tabs. The hanger is held in position on anvil 6 by the end of flexible strip 16. The fixing of the hanger to the board will have taken place as a result of their being pinched between fastening head 2 and anvil 6. Any traces that may have been left by the fastening head on the board will be on a non-visible side. Then, a feeding device (pre-set in accordance with the spacing between two hangers) positions the second hanger and the following ones, thus avoiding manual positioning. Without departing from the scope of the invention, use can be made of strips of hangers of different shapes and sizes, provided with a single anchoring rose element 23 or with several rose elements. Anvil 6 is then equipped with a number of pins 8 corresponding to the number of rose elements.

The invention claimed is:

1. An automatic machine for fastening frame hangers taken from a strip of hangers joined together, comprising a vertically mobile fastening head, controlled by a jack, for driving into a board a hanger positioned in relation to a shaped anvil located on a support plate, wherein said shaped anvil is a fastening and cutting anvil displaceable between a bottom position, in which the anvil retracts below the level of the support plate and a top position, in which the anvil projects above said plate, and a blade the central part of which forms a bridge, is fixed to the plate, in contact with the anvil.

2. The automatic fastening machine according to claim 1, wherein the upper face of the anvil is equipped with a number of pins corresponding to that of anchoring rose elements provided in each hanger of the strip of hangers.

3. Automatic The automatic fastening machine according to claim 2, wherein the pins are separated from one another by the same spacing as that for the anchoring rose elements.

4. The automatic fastening machine according to claim 1, wherein a flexible strip, fixed to the support plate, comes to bear on a border of the anvil.

5. The automatic fastening machine according to claim 2, wherein the strip of hangers is formed of a succession of hangers joined to one another by connecting tabs separated by a pre-cut portion.

6. The automatic fastening machine according to claim 5, wherein the pre-cut portion is located in alignment with the anchoring rose elements.

7. The automatic fastening machine according to claim 1, wherein a lower part of the jack hinges on a swinging lever which extends beneath the support plate, with an opposite end of said lever supporting the fastening and cutting anvil, so that deployment of a rod of the jack causes the anvil to rise and the fastening head to lower, to pinch the board and the hanger between the anvil and fastening head.

8. The automatic fastening machine according to claim 1 wherein the strip of hangers is formed of a succession of hangers joined to one another by connecting tabs separated by a pre-cut portion.

* * * * *